United States Patent [19]

Addie et al.

[11] 4,007,071
[45] Feb. 8, 1977

[54] PROCESS FOR MAKING EMBOSSED NEEDLE-BONDED FABRIC WALL COVERINGS

[75] Inventors: Lee W. Addie, Millersville; Harold W. Nikolaus, Columbia, both of Pa.

[73] Assignee: Armstrong Cork Company, Lancaster, Pa.

[22] Filed: May 27, 1975

[21] Appl. No.: 581,264

Related U.S. Application Data

[62] Division of Ser. No. 475,326, May 31, 1974, Pat. No. 3,924,040.

[52] U.S. Cl. .............................. 156/148; 156/209; 156/220; 264/220; 264/293; 428/141; 428/161; 428/234; 428/300

[51] Int. Cl.$^2$ ............... B32B 3/00; B32B 5/06; B32B 31/08

[58] Field of Search .......... 156/148, 209, 219, 220; 264/220, 293; 428/141, 156, 172, 161, 162, 234, 280, 300, 301

[56] References Cited

UNITED STATES PATENTS

| | | | |
|---|---|---|---|
| 3,704,191 | 11/1972 | Buresh et al. | 156/209 |
| 3,819,465 | 6/1974 | Parsons et al. | 156/148 |
| 3,834,978 | 9/1974 | Nisenson et al. | 156/148 |
| 3,924,040 | 12/1975 | Addie et al. | 156/148 |

Primary Examiner—William A. Powell
Assistant Examiner—M. G. Wityshyn

[57] ABSTRACT

A non-woven material is applied to the surface of a woven scrim. The non-woven material is needle-bonded to the scrim. The composite structure is then embossed. The embossed pattern is placed by a heated embosser on the finished product and in the non-embossed areas, the heat of embossing causes the non-woven material to partially melt and assume a textured effect which mirrors the texture of the woven scrim.

3 Claims, 3 Drawing Figures

U.S. Patent   Feb. 8, 1977   4,007,071

PROCESS FOR MAKING EMBOSSED NEEDLE-BONDED FABRIC WALL COVERINGS

CROSS-REFERENCE TO RELATED APPLICATION

This is a division, of application Ser. No. 475,326, filed May 31, 1974, now U.S. Pat. No. 3,924,040.

BACKGROUND OF THE INVENTION

1. Field of the Invention

The invention is directed to a wall covering structure and, more particularly, to a wall covering structure having a textured surface.

2. Description of the Prior Art

It is old in the art to make a fabric covering by utilizing a woven or non-woven scrim structure and placing on one or both sides thereof a non-woven felted material. This material is then needle-bonded to the scrim. A very typical example of this type of product is the "Ozite" Indoor-Outdoor Carpet.

U.S. Pat. No. 2,861,372 shows metal foil sheets being placed on either side of a woven fabric. The composite product is subjected to pressure and the foil sheets assume generally the textured effect of the woven inner core.

The invention is directed to an improved fabric for use as a wall covering wherein the product is provided with an embossed pattern which mirrors the image of the embossing roll, and, at the same time, a secondary non-embossed pattern which mirrors the general configuration of supporting scrim for the fabric.

Summary of the Invention

The coarsely woven scrim is used to stabilize a non-woven fabric. The felted non-woven fabric is needled to the scrim and, in general, provides a single flat surface product. The flat surface of the product is provided with an embossed pattern due to a heated embossing roll. The melting point of the non-woven fabric is substantially below the melting point of the scrim and close to the temperature of the embossing roll. The heat from the embossing roll which embosses a pattern on the product will cause partial melting of the non-woven fabric fibers in the non-embossed area. The partially melted fibers tend to flow around the individual fibers of the coarsely woven scrim and give the non-embossed areas of the finished product a textured effect.

Description of the Preferred Embodiment

The invention is basically directed to the use of a scrim, either woven or non-woven, in a generally open or coarse weave which has applied to at least one surface thereof a non-woven felted fabric material. This material is needle-bonded to the scrim and then a decorative pattern is embossed on the composite product. The heat of embossing causes the needle-bonded felted fabric in the non-embossed areas and large embossed areas to partially melt and take on a texturing which mirrors the configuration of the scrim.

Figure 1:
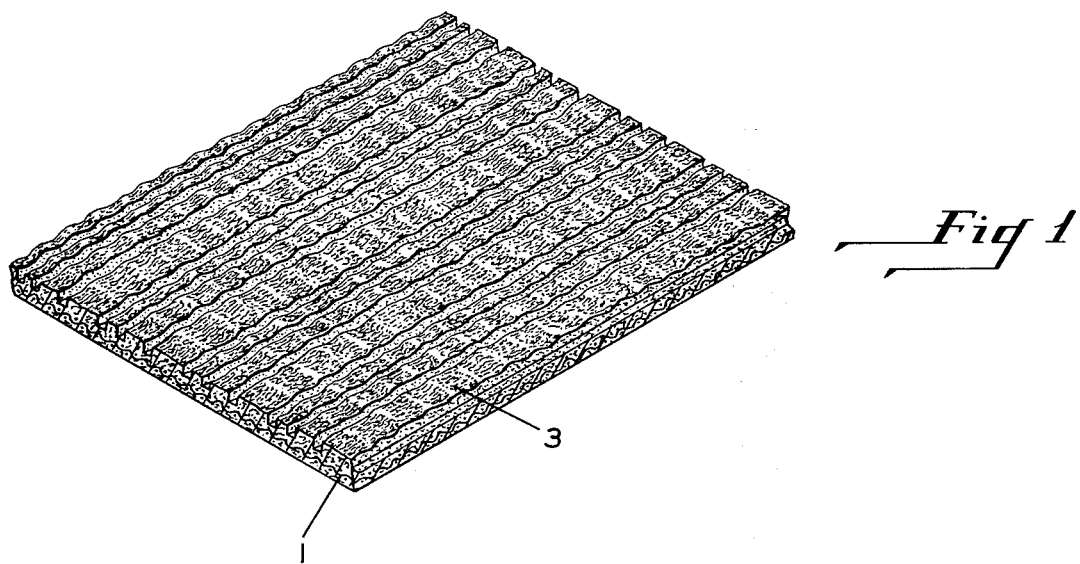
FIG. 1 is a perspective view of the product made by the invention herein.
Figure 2:
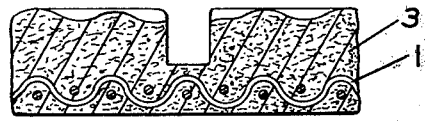
FIG. 2 is a cross-sectional view of the product made by the invention herein.

Referring now to FIGS. 1 and 2, the scrim may be a woven or non-woven fabric. Normally, it is a coarsely woven glass fiber scrim made with about 8 – 10 yarns per inch in its warp and woof directions. The scrim could be made from jute or a metal wire. The important characteristic of the scrim is that it will be a material which will not heat distort at the embossing temperature. The embossing temperature is carried out in the range of 300° to 350° F and, therefore, the scrim must not be heat distortable at those temperatures.

On one surface of the scrim is placed a non-woven felted material. This material may be a modacrylic, a polyacrylic, a rayon, a nylon, or a polypropylene material. A particularly useful material is a modacrylic fiber sold by Tennessee Eastman Chemical Company under the trade name "Verel." This is a manufactured fiber in which the fiber-forming substance is a long chain synthetic polymer composed of less than 85%, but at least 35%, by weight of acrylonitrile units

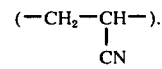

This is a material which has a modulus of 28 grams/-denier, a toughness of 0.49 grams/denier, a tenacity of 2.0 to 2.5 grams/denier and a specific gravity of approximately 1.37. The fibers are generally ribbon in shape and are used in approximate 3 inch lengths. The material is laid up as a felted material. That is, the fibers are not in any way bonded together, but are simply randomly laid one upon the other to form a felt-like material.

Figure 3:
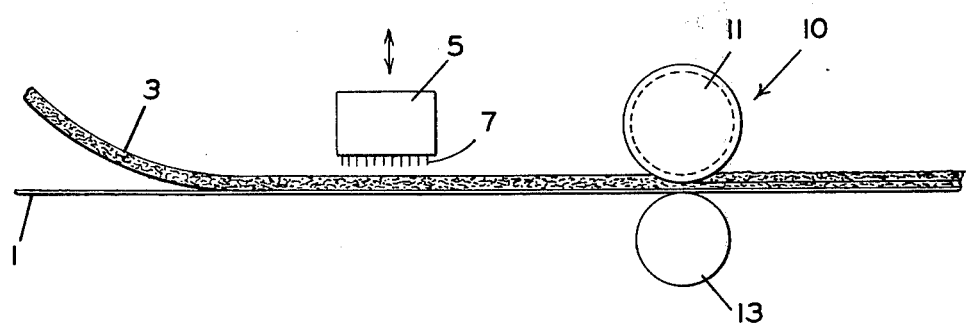
FIG. 3 is a schematic view of the method of manufacturing the product of invention herein.

In FIG. 3 there is shown generally the process for manufacturing the product herein. The scrim 1 is moved from left to right and has placed on the upper surface thereof the felted material 3. The two layers of material, one laid upon the other, are then moved to a needle-bonding apparatus 5 which is conventional in the art and is basically nothing more than a reciprocating head with a large number of barbed needles mounted thereon. The barbed needles 7 penetrate both the felted material and the scrim. Due to the large concentration of needles per square inch and the rapidity with which the needles are passed through the slowly moving composite two-layer structure, the fibers from the felted material are pushed into the openings of the coarsely woven scrim and are mechanically locked to the scrim and to other fibers within the composite structure. Such a bonding technique is extremely old in the art and has been used extensively in the manufacture of the needle-bonded indoor-outdoor carpeting which is normally sold under the trade name "Ozite" a trademark of Ozite Corporation. If desired, the underneath surface of the needled product may be provided with a conventional carpet latex back coating which will tend to adhesively lock together the fibers on the back surface of the composite product and particularly lock the fibers on the back surface of the scrim. Normally about two-thirds of the felted product after needle-bonding will exist on the upper surface of the scrim with the remaining one-third being within and on the back side of the woven scrim. Application of the latex coat is optional and it simply insures a better bonding of the felted layer to the scrim. The use of latex coatings is quite conventional in the tufted carpet art wherein all tufted carpet is provided with a conventional latex rubber back coating to bond the tufts of carpeting fabric to the scrim of the carpet material. The composite product now needle-bonded together is then passed to an embossing roll assembly 10 which has an upper embossing roll 11 with an embossing surface thereon and a conventional back-up roll 13 which simply supports the product while the surface configuration of embossing roll 11 is placing a pattern on the composite fabric.

The upper embossing roll 11 is heated to what is considered a low embossing temperature of approximately 300° to 350° F. In one preferred embodiment of the invention, the embossing roll is simply provided with a plurality of raised rings or lands so that the finished product is provided with an embossed series of parallel lines on the surface thereof. A fabric product made from the above mentioned Verel fiber will have a melt point for the fiber at approximately 300° to 350° F. The embossing roll contacting the needle-bonded felted material 3 will cause a melting of the fibers contacted by the lands of the embossing roll and a heat embossing of the product to provide a plurality of parallel line structures in the finished product. The combination of the pressure of the embossing roll and the heat results in a definite mechanical deformation of the finished product and leaves a definite groove in the upper surface of the finished product. The back surface of the product, which is in the direction of the scrim side of the product, is still maintained in its generally flat configuration. The areas between the lands of the embossing roll do not emboss the felted needle-bonded product in any way. However, there is a transmission of heat from the embossing roll to the felted material. Because this heat is at about the melt temperature of the felted material, there is a certain amount of melting of the fibers forming the felted product. The melting is not sufficient to cause the individual fibers to flow together to form a unitary mass. It is more of a softening of the fibers than a true melting of the fibers. The softened or partially melted fibers tend to flow around the yarns forming the closely woven pattern of the scrim. This then causes the product to assume a textured surface effect in the non-embossed areas. In these non-embossed areas, there are yarns moving in both the warp and woof direction due to the fact that the yarns of the scrim move in the warp and woof direction. These yarns tend to overlap each other in different directions at the points of intersection and have open areas between the different yarns and, therefore, there is provided on the surface of the felted product raised and depressed areas where the felted product, due to its softening, has tended to generally assume the contour of the underlying scrim. In the embossed areas, particularly large embossed areas, there is a textured effect also. The contour of the scrim is mirrored in the felted fabric which is pressed against the scrim by the embossing means.

The texture is quite delicate and the product still generally retains its fibrous appearance in the non-embossed areas. The generally textured effect in combination with the embossed pattern provides a very pleasing effect. It is obvious that the flexibility of design can be increased by not only varying the embossed pattern which is placed upon the felted material, but also by varying the characteristics of the scrim utilized. As used herein and particularly in the claims, the term "scrim" is meant to cover both a woven and a non-woven material. It is meant to cover a product which generally has parallel yarns positioned generally in two paths 90° apart and these yarns may be woven or non-woven. The yarns may be held together in a non-woven manner simply by having the yarns heat fused to each other at their points of intersection.

What is claimed is:

1. A process for making a fabric comprising the steps of:
   a. moving a scrim with a coarse open weave structure towards a needle-bonding means,
   b. placing on the upper surface of the scrim a non-woven felted fabric,
   c. passing both the scrim and its overlying felted fabric covering through a needle-bonding means to needle-bond the felted fabric to the scrim by mechanically locking the fibers of the felted material to the scrim and to themselves,
   d. passing the resulting composite product, with the felted fabric facing upward, to an embossing structure which has its embossing means engaging the upper surface of the composite product,
   e. heating said embossing means to a temperature which is approximately equal to the melt temperature of the felted fabric and substantially below the melt temperature of the scrim; and
   f. embossing a pattern on the side of the composite structure containing the felted fabric to provide a definite pattern to the composite product while, at the same time, causing a softening of the individual fibers of the felted fabric to cause said felted fabric to assume the general surface contour of the scrim, whereby there is produced an end product which has both a definite pattern as provided by the embossing means and an irregular surface texturing which results from the softened felted fabric assuming generally the surface contour of the scrim.

2. The process of claim 1 wherein the embossing of a pattern is carried out to provide large pattern embossed areas which have an irregular surface textured effect in the embossed as well as non-embossed areas.

3. The process of claim 1 wherein the heating of the embossing means is controlled to keep the temperature thereof at about the melt temperature of the felted fabric and approximately 50° F below the melt temperature of the scrim.

* * * * *